though abandoned.

3,333,007
FLUOROALKYLTRISULFONYLMETHANES
Clyde Stephen Scanley, Stamford, Conn., assignor to American Cyanamid Company, Stamford, Conn., a corporation of Maine
No Drawing. Filed Jan. 4, 1967, Ser. No. 607,153
10 Claims. (Cl. 260—607)

ABSTRACT OF THE DISCLOSURE

Fluorine substituted trisulfonylmethane compounds, and process for preparation, of the type $X[C(SO_2R)_3]_y$ where R typically is a fluorine substituted aliphatic or aromatic group, X is hydrogen or a salt-forming cation such as sodium, and y corresponds to the valence of X.

---

This application is a continuation-in-part of Ser. No. 384,233, filed July 21, 1964, now abandoned.

This invention relates to new and useful trisulfonylmethanes. The invention is more particularly concerned with the discovery of a new and unexpectedly beneficial class of fluorine substituted derivatives of trisulfonylmethane which exhibits excellent properties of reducing surface tension and modifying the inter-facial characteristics of various liquids and solids. The manifestation of these properties will, of course, be seen in their utilization as surfactants, emulsifiers, wetting agents, disperants, anticorrosives and the like in industrial, laboratory and household applications.

It is a principal object of the present invention therefore to provide a new and useful class of surface tension reducing compounds.

It is a further object to provide a novel class of trisulfonylmethane compounds.

These and other more specific objects of the present invention will become apparent as the description of the invention is further detailed.

The novel compounds of the present invention may be generally depicted as fluorine substituted trisulfonylmethanes of the formula

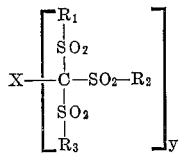

wherein X is hydrogen or a metal, amino, or ammonium cation; $R_1$, $R_2$ and $R_3$ are alkyl, phenyl, tolyl, cyclohexyl, or $-C_nH_{2n}-Z-C_mH_{2m+1}$ wherein Z is an interrupter radical selected from the group consisting of oxy, phenylene, naphthylene and cyclohexylene and $n+m$ is a whole number from 2 to 21; wherein at least one of $R_1$, $R_2$ and $R_3$ is fluorine substituted and y is a whole number from 1 to 4, inclusive, corresponding to the valence of X. In the case of X being hydrogen, the product may be more or less ionized depending on the environment. For example, the compound is ionized in water but not ordinarily so in the pure state.

In a compound wherein at least one of $R_1$, $R_2$ and $R_3$ are alkyl or $-C_nH_{2n}-Z-C_mH_{2m+1}$, the groups may be either normal or branched chain structures and will embrace lower alkyl, i.e., $C_1$ to $C_4$, as well as higher alkyl, i.e., pentyl, hexyl, heptyl, octyl, nonyl, decyl, undecyl, dodecyl, tridecyl, pentadecyl, hexadecyl, octadecyl and the like. The above general formula is intended to encompass fluorine substituted structures wherein $R_1$, $R_2$ and $R_3$ are identical as well as fluorine substituted structures wherein $R_1$, $R_2$ and $R_3$ are of different or mixed character. Moreover, within each of these two classifications the general formula is intended to include compounds wherein only one or two of $R_1$, $R_2$ and $R_3$ are fluorine substituted and compounds wherein the degree of fluorine substitution varies among $R_1$, $R_2$ and $R_3$.

The following is an illustrative but nonlimitative list of compounds of the foregoing classes. It will be obvious that a plurality of other structures are included besides those particularly exemplified.

tris[perfluoroethylsulfonyl]methane
tris[n-perfluoroheptylsulfonyl]methane
tris[n-perfluorododecylsulfonyl]methane
tris[(perfluorohexyloxy)ethylsulfonyl]methane
bis[ethylsulfonyl]-[perfluoroethylsulfonyl)methane
bis[n-perfluoroamylsulfonyl]-[n-amylsulfonyl]methane
bis[methylsulfonyl]-[n-perfluorooctadecylsulfonyl]methane
bis[phenylsulfonyl]-[n-perfluorododecylsulfonyl]methane
bis[perfluorohexylsulfonyl]-[n-dodecylsulfonyl]methane
bis[perfluorophenylsulfonyl]-[dodecylsulfonyl]methane
tris[1,1-dihydroperfluoroethylsulfonyl]methane
tris[n-1,1-dihydroperfluoroheptylsulfonyl]methane
tris[1,1-dihydroperfluoro-2,4,6-trimethylheptylsulfonyl]methane
tris[n-1,1-dihydroperfluorododecylsulfonyl]methane
tris[n-1,1-dihydroperfluorooctadecylsulfonyl)methane
tris[(1,1-dihydroperfluorohexyloxy)ethylsulfonyl]methane
tris[1,1-dihydroperfluorohexyloxy-n-heptylsulfonyl]methane
tris[n-1,1,5-trihydroperfluoroamylsulfonyl]methane
tris[p-1,1,2,2-tetrahydroperfluoroheptylbenzylsulfonyl]methane
bis[ethylsulfonyl]-[1,1-dihydroperfluoroethylsulfonyl]methane
bis[n-1,1-dihydroperfluoroamylsulfonyl]-[n-amylsulfonyl]methane
bis[n-1,1-dihydroheptylsulfonyl]-[naphthylsulfonyl]methane
bis[methylsulfonyl]-[n-1,1-dihydroperfluorooctadecylsulfonyl]methane
bis[1,1-dihydroperfluorohexylsulfonyl]-[n-1,1-dihydroperfluorododecylsulfonyl]methane
bis[phenylsulfonyl]-[n-1,1-dihydroperfluorododecylsulfonyl]methane
bis[1,1-dihydroperfluorohexylsulfonyl]-[n-dodecylsulfonyl]methane
bis[n-1,1-dihydroperfluoroheptylsulfonyl]-[methylsulfonyl]methane
bis[n-1,1,5-trihydroperfluoroamylsulfonyl]-[hexylsulfonyl]methane
bis[n-1,1,4-trihydroperfluorobutylsulfonyl]-[n-1,1-dihydroperfluorododecylsulfonyl]methane
bis[tolylsulfonyl]-[n-1,1-dihydroperfluoroheptylsulfonyl]methane
bis[cyclohexylsulfonyl]-[n-1,1-dihydroperfluoroheptylsulfonyl]methane
bis[p-ethylperfluorocyclohexylmethylsulfonyl]-[n-heptylsulfonyl]methane
bis[1-hydroperfluorocyclohexylsulfonyl]-[n-heptylsulfonyl]methane
bis[p-n-perfluoroheptylcyclohexylmethylsulfonyl]-[ethylsulfonyl]methane
bis[p-heptylcyclohexyl-n-1,1-dihydroperfluorobutylsulfonyl]-[n-amylsulfonyl]methane.

The salts are conveniently prepared by adding the requisite salt-forming compound to an aqueous slurry or organic solvent dispersion of a fluorine substituted trisulfonylmethane where X is hydrogen. The salt-forming compounds are, of course, basic in character, and include metal hydroxides, amines and ammonium hydroxide to form the respective metal, amino and ammonium salts.

Representative metal salts formed in this manner include those of the alkali metals, e.g., sodium, potassium and lithium; the alkaline earth metals, e.g., magnesium, calcium and barium; the iron group metals, e.g., iron, cobalt and nickel; the palladium group metals, e.g., ruthenium, rhodium and palladium; the platinum group metals, e.g., osmium, iridium and platinum; the metals of subgroup IB of the Periodic Chart, e.g., copper, silver and gold; the metals of subgroup IIB, e.g., zinc, cadmium and mercury; certain metals of subgroup IVB, e.g., tin and lead; certain metals of subgroup VB, e.g., antimony and bismuth; and aluminum.

The salt-forming amines include alkyl amines such as methylamine, ethylamine, dimethylamine, trimethylamine, triethylamine, triisopropylamine, triisobutylamine, cyclohexylamine and the like; hydroxy amines such as monoethanolamine, diethanolamine, triethanolamine, monoisopropanolamine, diisopropanolamine, triisopropanolamine, and the like; heterocyclic amines such as morpholine, pyridine, piperidine, and the like; aromatic amines such as aniline, and the like; and quaternary ammonium hydroxides such as tetremethylammonium hydroxide, tetraethylammonium hydroxide, trimethylhydroxyethylammonium hydroxide, tetrahydroxyethylammonium hydroxide, benzyltrimethylammonium hydroxide and the like.

The term "amino" in the definition of the salt means the cation formed from any of the foregoing amines. The precise chemical structure of the cation will, of course, depend on the character of the basic reactant chosen to form a salt by neutralization with the fluorine substituted trisulfonylmethane. For example, when a primary, secondary or tertiary amine is the base, "amino" more particularly means an alkyl ammonium cation; when a quaternary ammonium hydroxide is the reactant, "amino" defines a quaternary ammonium cation. When a hydroxy amine is the base, "amino" is a hydroxy quaternary ammonium cation or a hydroxy alkyl ammonium cation.

From the structural formula appearing hereinbefore and the values for "y," it will be observed that monovalent, divalent, trivalent and tetravalent metals may all be employed in the preparation of such salts. In many instances, the alkali metal salts of the fluorine substituted trisulfonylmethanes are preferred for maximum solubility in water, and in these cases sodium, potassium and lithium salts are preferred. In still other cases the alkaline earth metal salts such as those of magnesium, calcium and barium are preferred particularly where the compounds are to be employed in oil, or water/oil or oil/water emulsions or in oleaginous mediums.

The lower alkyl substituted trisulfonylmethanes wherein $R_1$, $R_2$ and $R_3$ are non halogen substituted methyl, ethyl, propyl, or butyl have been reported in the literature by Evald Samen in Arkiv. Kemi, Mineral. Geol. 12B, No. 51 (1938), 14B, No. 28 (1941), 15B, No. 15 (1942) and 24B, No. 6 (1947). However, such compounds have never demonstrated any significant surface active properties nor ability to modify surface tension in any system. In fact, when tested these compounds will be found to be devoid of significant surface activity. Quite unexpectedly, however, when one prepares the hitherto unknown fluorine substituted derivatives of trisulfonylmethane as defined herein, excellent surfactant properties are observable even as compared to the higher alkyl, non fluorine substituted trisulfonylmethanes.

The compounds of the present invention can be prepared by several routes. One method is as follows:

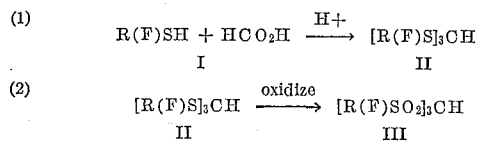

In the above reaction, a suitable fluorine substituted mercaptan (I) wherein R has any of the values specified for $R_1$, $R_2$ or $R_3$, as defined above, is reacted with formic acid or a lower alkyl ester thereof to form the corresponding fluorine substituted trithioorthoformate (II). The reaction is conducted in the presence of anhydrous HCl. The organic layer containing the fluorine substituted trithioorthoformate (II) is then separated from the unreacted layer and dissolved in a suitable inert solvent such as chloroform. This mixture is then treated with a 100% excess of peracetic acid at a temperature of −20 to −30° C. with constant agitation of the reaction mixture while the peracetic acid is being added. After about a half hour the reaction mixture is allowed to warm to room temperature and then permitted to stand overnight. The product is recovered in a pure state by conventional techniques such as by treating with additional chloroform and extracting with water. The solvent is evaporated off and the product recrystallized from a suitable solvent such as, for example, ethyl alcohol.

Although chloroform is the preferred solvent for the reaction, any of a number of equally useful inert halohydrocarbon solvents such as dichloroethane, methylene chloride, and the like, may be employed.

The time of oxidation will vary with the temperature conditions and solvent being employed, but generally the reaction will have run to completion within four to eight hours for most, if not all, of the reactants employed.

In those cases where the salt of the final compound is to be prepared, equivalent quantities of a suitable base such as sodium hydroxide, potassium hydroxide, calcium hydroxide, ammonium hydroxide, or the like are added to an aqueous acetone solution or an aqueous slurry or an organic solution of the fluorine substituted trisulfonylmethane so as to obtain the salt. For the preparation of certain metal salts such as, for example, aluminum, an alkali metal salt of a fluorine substituted trisulfonylmethane may be reacted with a metal halide to obtain the desired salt. In still other cases, a metal oxide such as, for example, zinc oxide, may be reacted with a fluorine substituted trisulfonylmethane, in solution or in a slurry, to yield the desired metal salt.

While the foregoing method is a convenient route for the preparation of numerous compounds of the class herein contemplated, it is limited so far as is known to the preparation of products wherein less than all of the hydrogen atoms on the R groups are replaced by fluorine. In particular, the foregoing method cannot be employed to prepare trisulfonylmethanes wherein fluorine is substituted on a carbon atom in $R_1$, $R_2$ and $R_3$ which is alpha to —$SO_2$— or oxy. A route which does not possess this limitation is the Simons Process. This is a commercial electrochemical method whereby a trisulfonylmethane may be fluorinated by hydrogen fluoride in a single compartment cell constructed of any metal resistant to hydrogen fluoride. After electrolysis the hydrogen fluoride is stripped from the effluent gases by a condenser and returned to the cell. The less volatile fluorinated trisulfonylmethane products remaining in the cell, because of their high density and insolubility in hydrogen fluoride, may be withdrawn from the bottom of the cell. This product, a fluoride, is then hydrolyzed with water to give the fluorinated product having fluorine atoms substituted on carbon atoms alpha to —$SO_2$— and oxy. The Simons Process is well known and may be adapted to the preparation of fluorine substituted trisulfonylmethanes having widely varying degrees of fluorination. For a more thorough discussion of the process see "Fluorine Chemistry," J. H. Simons, Ed. 1, 414–420 (1950) and 2, 340–341 (1954).

When the fluorine substituted trisulfonylmethanes of this invention are added to water the surface tension of the solution is reducible even over the excellent reduction in surface tension effected by the nonfluorine substituted analogs of these compounds. The latter compounds are the subject of applicant's copending case, Serial No.

324,184, filed Nov. 18, 1963. The novel trisulfonylmethanes may be directly admixed with the solution they are sought to modify, as is generally the case, or, alternatively, they may be painted, dipped, or sprayed on the surface of solid objects whose surface properties it is desired to modify.

While it is preferred to employ the novel fluorine substituted trisulfonylmethanes singly they may, in a given instance, be admixed with each other or other ingredients, active or inactive, such as diluents, carriers and the like. If desired, they may be combined in a formulation with other well known anionic, cationic, or nonionic emulsifiers.

The invention will be further illustrated by the following examples of specific methods of preparation of representative members of the series. These examples are set forth primarily for the purpose of illustration and any specific enumeration of detail contained therein should not be interpreted as a limitation on the case except where indicated in the appended claims. All parts are parts by weight unless otherwise indicated.

EXAMPLE 1

*Tris[n-1,1-dihydroperfluoroheptylsulfonyl]methane*

$$[n-CF_3(CF_2)_5CH_2SO_2]_3CH \qquad (I)$$

A flask containing 30 parts (0.0820 mole) of n-1,1-dihydroperfluoroheptylmercaptan $CF_3(CH_2)_5CH_2-SH$ is chilled to 0° C. and saturated with anhydrous HCl. To this mixture is added 2.0 parts (0.0273 mole) of ethyl formate and the final mixture is held at 0° C. for two days with occasional resaturation with HCl. The layer containing water, ethanol and HCl is separated and the organic layer washed twice with water and then stripped at 80° C. and 5 mm. pressure. The trithioorthoformate product $[CF_3(CF_2)_5CH_2S]_3CH$ is then added to 200 parts by volume of chloroform, chilled to −30° C. and held at this temperature while 48 parts of 41% peracetic acid is run in over a ½ hour period. The temperature is then allowed to rise to 25° C. and held there for 20 hours. The reaction mixture is washed 6 times with water and the organic phase is concentrated to about 100 parts by volume by boiling. About 150 parts by volume of ethanol is then added and the mixture chilled to −20° C. and filtered. A crop of 25 parts of (I) is isolated, having a neutral equivalent of 1210.

An aqueous solution of 0.05% of (I) at pH 7.0 and 25° C. would be expected to have a surface tension of about 15 dyns./cm. as measured with a DuNouy tensiometer.

EXAMPLE 2

*Tris[n-1,1,5-trihydroperfluoroamylsulfonyl]methane*

$$(CHF_2CF_2CF_2CF_2CH_2SO_2)_3CH \qquad (II)$$

n-1,1,5-trihydroperfluoroamyl mercaptan $$[H(CF_2)_4CH_2SH]$$

is converted to (II) by the method of Example 1 and a 0.05% solution of its sodium salt at 25° C. would be expected to show a surface tension of about 18 dyns./cm.

EXAMPLE 3

*Bis[methylsulfonyl]-[n-1,1-dihydroperfluorooctadecylsulfonyl]methane*

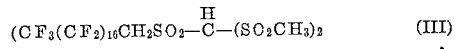

(A) A mixture of formalin and methyl mercaptan is saturated with anhydrous hydrochloric acid. On standing at room temperature overnight an organic phase separates from the aqueous acid phase. The organic phase is distilled to obtain dimethyldithioformal, B.P. 148–152° C.

(B) A solution of the product of Part A in chloroform is treated at −20° C. with a 100% molar excess of a 50% peracetic acid solution to obtain bis[methylsulfonyl]methane, M.P. 143–144° C.

An aliquot of the product of Part B of this example in acetone is treated with an equimolar amount of sodium ethoxide and methyl n-1,1-dihydroperfluorooctadecylthiosulfonate, $CH_3SO_2-S-CH_2(CF_2)_{16}CF_3$, to obtain

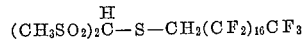

which is oxidized with twice its equivalent of peracetic acid at 20° C. to obtain (III) which has a neutral equivalent of 1110. A 0.05% solution of (III) at pH 7.0 and at 25° C. would be expected to have a surface tension of about 18 dyns./cm.

EXAMPLE 4

*Bis[n-1,1,4-trihydroperfluorobutylsulfonyl]-[n-1,1-dihydroperfluorododecylsulfonyl]methane*

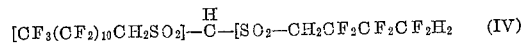

By the method of Example 3, trihydroperfluorobutylmercaptan is treated with formalin to give the thioformal which is oxidized to bis(1,1,4-trihydroperfluorobutylsulfonyl)methane, $(HCF_2CF_2CF_2CH_2SO_2)_2CH_2$. This is then condensed with sodium ethoxide and methyl n-1,1-dihydroperfluorododecylthiosulfonate and oxidized to give (IV).

A 0.05% solution of (IV) at pH 7.0 and at 25° C. would be expected to have a surface tension of about 18 dyns./cm.

EXAMPLE 5

*Tris[1,1-dihydroperfluorohexyloxy)ethylsulfonyl]methane*

$$[CF_3(CF_2)_4CH_2OCH_2CH_2-SO_2]_3CH \qquad (V)$$

n-1,1-dihydroperfluorohexyloxyethyl mercaptan $$[CF_3(CF_2)_4CH_2-O-CH_2CH_2-SH]$$

is converted to the trithioorthoformate and then oxidized as in Example 1. The product (V) as a 0.05% solution in water at 25° C. and pH 7.0 would be expected to give a surface tension of about 16 dyns./cm.

EXAMPLE 6

*Tris[p-1,1,2,2-tetrahydroperfluoroheptylbenzylsulfonyl]methane*

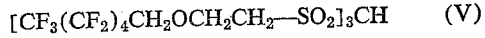

The compound (VI) is prepared from the mercaptan following the procedure in Example 1. A neutralized solution at 25° C. and pH 7.0 would be expected to show a surface tension of about 19 dyns./cm.

EXAMPLE 7

*Bis[tolylsulfonyl]-[n-1,1-dihydroperfluoroheptylsulfonyl]methane*

Using the procedure of Example 3 with p-toluene thiol as mercaptan and condensing n-1,1-dihydroperfluoroheptylthiosulfonate with the formed tolyldisulfone, bis(tolylsulfonyl)methane, compound (VII) results. This compound in a 0.05% solution in water at 25° C. and pH 7.0 would be expected to have a surface tension of about 19 dyns./cm.

EXAMPLE 8

*Bis[cyclohexylsulfonyl]-[1,1-dihydroperfluoroheptylsulfonyl]methane*

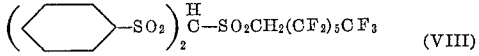

Using cyclohexylmercaptan, compound (VIII) is prepared following the procedure of Example 7. This product would be expected to have a surface tension of about 19 dyns./cm. at pH 7.0 and 25° C.

EXAMPLE 9

*Tris(n-perfluoroheptylsulfonyl)methane (IX)*

Tris(n-heptylsulfonyl)methane (0.10 mole) is fluorinated in a Simons cell to give a yield of 0.01 mole of tris(perfluoroheptylsulfonyl)methyl fluoride. This compound is then hydrolyzed with water to give (IX). The sodium salt of (IX) at 0.01% in water and at 25° C. would be expected to have a surface tension of about 15 dyns./cm.

EXAMPLE 10

*Amino salt of tris[n-1,1-dihydroperfluoroheptylsulfonyl] methane*

A slurry of 0.10 mole of the product of Example 1 in acetone is neutralized by adding to it, slowly with stirring, 0.10 mole of triethylamine. The solution is then chilled to −10° C. and the crystalline triethyl ammonium salt recovered by filtration.

EXAMPLE 11

Two-tenths percent solutions of the product of Example 10 and of the sodium salts of Examples 1 to 9 inclusive when placed as drops on a freshly scraped paraffin surface would be expected to spread very rapidly to such an extent that no contact angle can be measured with a protractor microscope having a lower limit of observative of 2°.

I claim:

1. A fluorine substituted trisulfonylmethane, of the formula

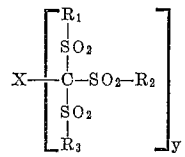

wherein X is hydrogen, or a metal, amino, or ammonium cation; $R_1$, $R_2$ and $R_3$ are selected from the group consisting of alkyl, phenyl, tolyl, cyclohexyl, and $$-C_nH_{2n}-Z-C_mH_{2m+1}$$

wherein Z is selected from the group consisting of oxy, phenylene, naphthylene and cyclohexylene and $n+m$ is a whole number from 2 to 21; wherein at least one of $R_1$, $R_2$ and $R_3$ is fluorine substituted and $y$ corresponds to the valence of X.

2. The trisulfonylmethane, tris[n-1,1-dihydroperfluoroheptylsulfonyl]methane.

3. The trisulfonylmethane, tris[n-1,1,5-trihydroperfluoroamylsulfonyl]methane.

4. The trisulfonylmethane, bis[methylsulfonyl]-[n-1,1-dihydroperfluorooctadecylsulfonyl]methane.

5. The trisulfonylmethane, bis[n-1,1,4-trihydroperfluorobutylsulfonyl]-[n-1,1-dihydroperfluorododecylsulfonyl]methane.

6. The trisulfonylmethane, tris[(1,1-dihydroperfluorohexyloxy)ethylsulfonyl]methane.

7. The trisulfonylmethane, tris[p-1,1,2,2-tetrahydroperfluoroheptylbenzylsulfonyl]methane.

8. The trisulfonylmethane, bis[tolylsulfonyl]-[n-1,1-dihydroperfluoroheptylsulfonyl]methane.

9. The trisulfonylmethane, bis[cyclohexylsulfonyl]-[1,1-dihydroperfluoroheptylsulfonyl]methane.

10. The trisulfonylmethane, tris(n-perfluoroheptylsulfonyl)methane.

References Cited

Balasubraminian et al.: J. Chem. Soc., 1954, p. 1845.

CHARLES B. PARKER, *Primary Examiner.*

DELBERT R. PHILLIPS, *Assistant Examiner.*